(12) United States Patent
Dalal et al.

(10) Patent No.: US 9,262,419 B2
(45) Date of Patent: Feb. 16, 2016

(54) SYNTAX-AWARE MANIPULATION OF MEDIA FILES IN A CONTAINER FORMAT

(71) Applicant: Microsoft Corporation, Redmond, WA (US)

(72) Inventors: Firoz Dalal, Sammamish, WA (US); Yongjun Wu, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 89 days.

(21) Appl. No.: 13/857,975

(22) Filed: Apr. 5, 2013

(65) Prior Publication Data

US 2014/0304303 A1    Oct. 9, 2014

(51) Int. Cl.
*G06F 17/30* (2006.01)
*G11B 27/36* (2006.01)

(52) U.S. Cl.
CPC .......... *G06F 17/30017* (2013.01); *G11B 27/36* (2013.01)

(58) Field of Classification Search
None
See application file for complete search history.

(56) References Cited

U.S. PATENT DOCUMENTS

| | | | |
|---|---|---|---|
| 7,076,392 B1 | 7/2006 | Wilson | |
| 7,827,116 B2* | 11/2010 | Piccionelli | G06Q 10/10 705/1.1 |
| 8,001,486 B2* | 8/2011 | Kumar et al. | 715/809 |
| 8,843,787 B1* | 9/2014 | Foster et al. | 714/42 |
| 2002/0141576 A1* | 10/2002 | Ripley et al. | 380/201 |
| 2004/0179032 A1 | 9/2004 | Huang | |
| 2004/0243882 A1* | 12/2004 | Zhou | 714/38 |
| 2005/0117580 A1 | 6/2005 | del Val et al. | |
| 2006/0126725 A1 | 6/2006 | Zeng et al. | |
| 2007/0047411 A1* | 3/2007 | Rivera et al. | 369/53.21 |
| 2007/0168591 A1 | 7/2007 | Chua | |
| 2007/0198595 A1* | 8/2007 | Obata et al. | 707/200 |
| 2008/0071617 A1* | 3/2008 | Ware | 705/14 |
| 2008/0175325 A1* | 7/2008 | Hannuksela et al. | 375/240.26 |
| 2008/0301588 A1* | 12/2008 | Kumar | H04N 7/24 715/841 |
| 2009/0193296 A1* | 7/2009 | Kellington et al. | 714/33 |
| 2009/0249301 A1* | 10/2009 | Kalla et al. | 717/127 |
| 2010/0037059 A1* | 2/2010 | Sun | H04N 1/32144 713/176 |
| 2010/0070448 A1* | 3/2010 | Omoigui | H01L 27/1463 706/47 |

(Continued)

OTHER PUBLICATIONS

Zhang et al, "End-to-end Data Integrity for File Systems: A ZFS Case Study", 2010, pp. 1-14.*

(Continued)

*Primary Examiner* — Hung Le
(74) *Attorney, Agent, or Firm* — Sunah Lee; Judy Yee; Micky Minhas

(57) ABSTRACT

A container format processing tool performs syntax-aware manipulation of hierarchically organized syntax elements defined according to a container format in a media file. For example, a container format verifier checks conformance of a media file to a container format, which can help ensure interoperability between diverse sources of media content and playback equipment. Conformance verification can include verification of individual syntax elements, cross-verification, verification that any mandatory syntax elements are present and/or verification of synchronization. Or, a container format "fuzzer" simulates corruption of a media file, which can help test the resilience of playback equipment to errors in the media files. The container format fuzzer can simulate random bit flipping errors, an audio recording failure or incorrect termination of recording. Or, a container format editor can otherwise edit the media file in the container format.

22 Claims, 6 Drawing Sheets software 180 implementing one or more innovations for syntax-aware manipulation of media files in a container format

(56) References Cited

U.S. PATENT DOCUMENTS

| | | | |
|---|---|---|---|
| 2010/0121936 A1* | 5/2010 | Liu | H04N 5/44543 709/217 |
| 2010/0150223 A1 | 6/2010 | Nagaraj et al. | |
| 2010/0325320 A1* | 12/2010 | Romain et al. | 710/52 |
| 2012/0121025 A1 | 5/2012 | Bonaparte et al. | |
| 2012/0275511 A1* | 11/2012 | Shemer | H04N 19/139 375/240.02 |
| 2013/0326302 A1* | 12/2013 | Han et al. | 714/752 |

OTHER PUBLICATIONS

International Search Report and Written Opinion dated Apr. 24, 2014, from International Patent Application No. PCT/US2013/059564, 12 pp.

Tektronix, Inc., "MPEG Test Systems MTS4SA Data Sheet," 16 pp., downloaded from http://www.tek.com/sites/tek.com/files/media/media/resources/2AW_18759_5_low_res.pdf (Oct. 2008).

Agama Technologies, "Agama Verifier," downloaded from http://www.agama.tv/pdf/product_brief_verifier.pdf, 2 pp. (document not dated / downloaded Feb. 22, 2013).

Digital Entertainment Content Ecosystem (DECE) LLC, "Common File Format & Media Formats Specification," version 1.0.5, 158 pp. (Oct. 2012).

Ebrahimi et al., "MPEG-4 Natural Video Coding—An Overview," *Signal Processing: Image Communication*, vol. 15, pp. 365-385 (Jan. 2000).

IMS Global Learning Consortium, Inc., "IMS GLC IWB/CFF Conformance Document," version 1.0 final specification, downloaded from http://www.imsglobal.org/iwbcff/, 10 pp. (Feb. 2012).

ISO/IEC, "Information Technology—Coding of Audio-Visual Objects—Part 12: ISO Base Media File Format," ISO/IEC 14496-12, 120 pp. (Oct. 2008).

ISO/IEC, "Information Technology—Coding of Audio-Visual Objects—Part 14: MP4 File Format," ISO/IEC 14496-14, 18 pp. (Nov. 2003).

ISO/IEC, "Information Technology—Coding of Audio-Visual Objects—Part 15: Advanced Video Coding (AVC) File Format," ISO/IEC 14496-15, 29 pp. (Apr. 2004).

ISO/IEC, "Information Technology—Generic Coding of Moving Pictures and Associated Audio Information: Systems," ISO/IEC 13818-1, 171 pp. (Dec. 2000).

Kim et al., "Conformance Test of Simple Profile MPEG-4 Texture Decoding," *Journal of Electronic Imaging*, vol. 11, No. 3, pp. 375-380 (Jul. 2002).

M4Scene, "SceneScope—Understand and Meet All MPEG-4/PIFF/3GPP Industry Standards," downloaded from http://www.m4scene.com/product/show?class=SceneScope, 3 pp. (Jun. 2010).

Microsoft Corporation, "Advanced Systems Format (ASF) Specification," revision Jan. 20, 2006, 104 pp. (Jan. 2012).

Microsoft Corporation, "MPEG-4 File Sink," downloaded from http://msdn.microsoft.com, 7 pp. (downloaded Apr. 5, 2013).

Microsoft Corporation, "MPEG-4 File Source," downloaded from http://msdn.microsoft.com, 8 pp. (downloaded Apr. 5, 2013).

MiraVid, Inc., "MiraVid Products: MSight—Specifications," downloaded from www.miravid.com/spec_MSight.html, 5 pp. (document not dated / downloaded Feb. 22, 2013).

Moving Picture Experts Group, "Conformance Testing—MPEG-4 Conformance," MPEG N7649, downloaded from http://mpeg.chiariglione.org/standards/mpeg-4/conformance-testing, 4 pp. (Oct. 2005).

Alexander Noe, "Matroska File Format (Under Construction!)," 48 pp. (2009).

De Neve et al., "Using Bitstream Structure Descriptions for the Exploitation of Multi-layered Temporal Scalability in H.264/AVC's Base Specification," Lecture Notes in Computer Science, vol. 3767, pp. 641-652 (Nov. 2005).

Raulet et al., "Validation of Bitstream Syntax and Synthesis of Parsers in the MPEG Reconfigurable Video Coding Framework," IEEE Workshop on Signal Processing Systems, pp. 293-298 (Oct. 2008).

Tektronix, Inc. "MTS4EA Elementary Stream Analyzer—Compressed Video and Audio Analysis Software Data Sheet," 6 pp. (document marked Feb. 2009).

WebM Project, "Common Algorithm Interface," downloaded from http://www.webmproject.org/tools/vp8-sdk/group_codec.html, 9 pp. (document marked Oct. 28, 2009).

Written Opinion of the International Preliminary Examining Authority dated Jan. 14, 2015, from International Patent Application No. PCT/US2013/059564, 7 pp.

International Preliminary Report on Patentability dated Jun. 25, 2015, from International Patent Application No. PCT/US2013/059564, 9 pp.

Communication Pursuant to Rules 161(1) and 162 EPC dated Nov. 12, 2015, from European Patent Application No. 13771001.8, 2 pp.

\* cited by examiner software 180 implementing one or more innovations for syntax-aware manipulation of media files in a container format Figure 6 600
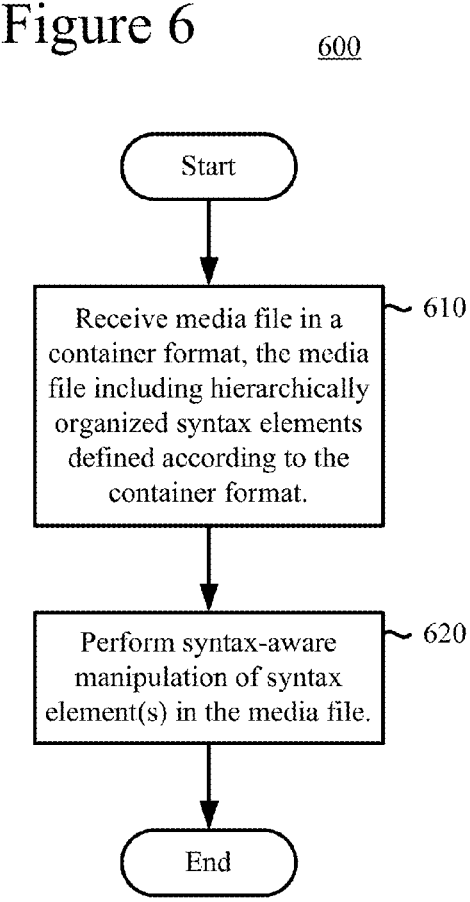
Figure 7 700 (example of stage 620)
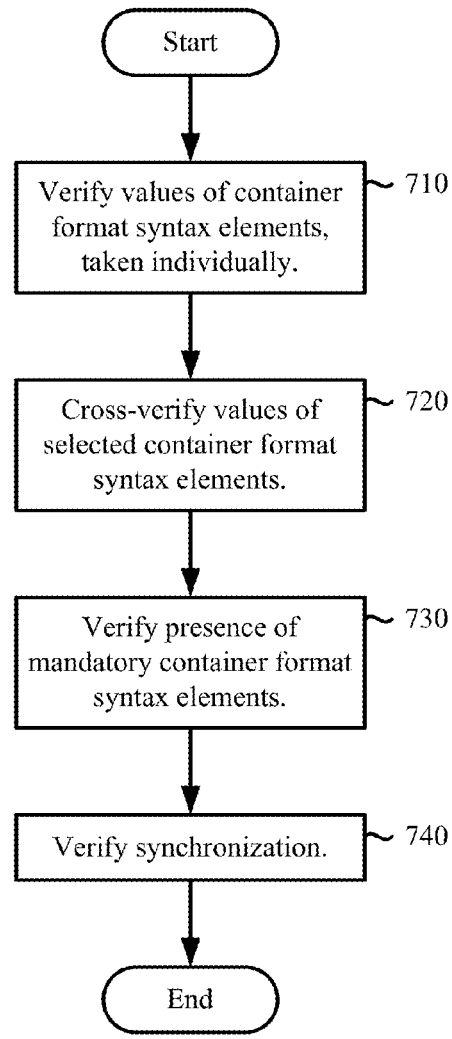

cross-verification: verify that attribute 2 of object 1 (840) is consistent with attribute 3 of object 2 (850) and attribute 1 of object 3 (860)

SYNTAX-AWARE MANIPULATION OF MEDIA FILES IN A CONTAINER FORMAT

BACKGROUND

Engineers use compression (also called source coding or source encoding) to reduce the bit rate of digital media content. Compression decreases the cost of storing and transmitting media information by converting the information into a lower bit rate form. Decompression (also called decoding) reconstructs a version of the original information from the compressed form. A "codec" is an encoder/decoder system. Over the last two decades, various video codec standards and formats have been adopted, and various audio codec standards and formats have been adopted. A codec standard or format typically defines options for the syntax of an encoded media bitstream (sometimes called an elementary media bitstream), detailing parameters in the elementary media bitstream when particular features are used in encoding and decoding. In many cases, a codec standard or format also provides details about the decoding operations a decoder should perform to achieve correct results in decoding.

A media container format specifies how to organize encoded media content for storage, transmission, etc. A media container format can specify metadata about the encoded media content, timing information, digital rights management information, error correction information or other information. Various container formats have been promulgated for multimedia content, including MPEG-2 TS/PS, Advanced Systems Format ("ASF") (formerly Advanced Streaming Format), MPEG-4 ("MP4") as defined in ISO/IEC 14496-12 (ISO base media file format), 14496-14 (MP4 file format) and 14496-15 (AVC file format), Common File Format ("CFF") and Matroska Video Format ("MKV"). The specification for a container format such as MP4 or CFF defines how to organize encoded media content and add metadata for encoded media content so that a media file is conformant with the container format. A container format specification typically defines options for the syntax of a media file in the container format, detailing the meaning and organization of parameters in the media file when particular features are used. In some cases, a container format specification may also provide details about operations to be performed by a container format sink or container format source. A container format sink puts encoded media content in an elementary media bitstream (e.g., from a media encoder such as an audio encoder or video encoder) into a media file according to a container format. A container format source parses the media file in the container format and provides the elementary media bitstream to a media decoder for decoding.

Every day, millions of media files in container formats are produced by diverse sources. Even more media files in container formats are consumed by different users through assorted activities. In some cases, a media file in a container format is corrupted due to random bit flips during streaming or conferencing. Or, a media file may be corrupted due to a storage failure, due to improper recording with a smartphone or for another reason. For many recent container formats, however, existing tools do not provide sufficient means to verify the conformance of media files to the container formats or at least identify corrupted file containers, nor do they provide sufficient means to alter elements of media files in order to test the resilience of playback equipment to errors in the media files.

SUMMARY

In summary, innovations described herein provide ways to perform syntax-aware manipulation of hierarchically organized syntax elements defined according to a container format in a media file. For example, a container format verifier checks conformance of media files to a container format, which can help ensure interoperability between diverse sources of media content and playback equipment. Or, a container format "fuzzer" simulates corruption of media files, which can help test the resilience of playback equipment to errors in the media files. Or, a container format editor creates equivalent media files, which can help test new objects in the media files.

According to one set of innovations described herein, a container format processing tool receives a media file in a container format for a presentation that includes audio content, image content and/or video content. The container format is tree-structured such that the media file includes hierarchically organized syntax elements defined according to the container format. For example, the hierarchically organized syntax elements defined according to the container format are objects and attributes of objects that are nested in a hierarchy according to the container format. The container format processing tool performs syntax-aware manipulation of at least some of the hierarchically organized syntax elements defined according to the container format in the media file.

For example, as part of syntax-aware manipulation, a container format verifier checks conformance of the media file to the container format. The verification can include single-element verification in which the container format verifier checks that the value of a given syntax element satisfies one or more constraints for the given syntax element according to the container format. Or, the verification can include cross-verification in which the container format verifier checks that the value of a given syntax element is consistent with values of one or more other syntax elements defined according to the container format. Further, the verification can include checking synchronization between audio samples and video samples in the presentation or checking for presence of any mandatory syntax elements defined according to the container format.

Or, as part of syntax-aware manipulation, a container format fuzzer simulates corruption of the media file in the container format. To simulate corruption of the media file, the container format fuzzer can replace valid values with other values for one or more syntax elements defined according to the container format, while preserving file format structure for the media file in the container format. Or, the container format fuzzer can simulate a random bit flip by altering value of a given syntax element. Further, the container format fuzzer can simulate an audio recording failure (e.g., by removing audio data from an audio track of the media file in the container format) or incorrect termination of recording (e.g., by adding extraneous syntax elements defined according to the container format to an object of the media file in the container format).

Or, as part of syntax-aware manipulation, a container format editor can otherwise edit the media file. For example, the container format editor can insert new syntax elements defined according to the container format into the media file, so as to model a problem with another media file in the container format. Or, the container format editor can detect one or more corrupted values among syntax elements defined according to the container format, and correct the one or more corrupted values.

The syntax-aware manipulation of syntax elements defined according to a container format in a media file can be implemented as part of a method, as part of a computing system adapted to perform the method or as part of a tangible computer-readable media storing computer-executable instructions for causing a computing system to perform the method.

The foregoing and other objects, features, and advantages of the invention will become more apparent from the following detailed description, which proceeds with reference to the accompanying figures.

BRIEF DESCRIPTION OF THE DRAWINGS

FIG. 6 is a flowchart illustrating a generalized technique for syntax-aware manipulation of hierarchically organized syntax elements defined according to a container format in a media file.

FIG. 7 is a flowchart illustrating a technique for verifying conformance of a media file to a container format.

DETAILED DESCRIPTION

Figure 1:
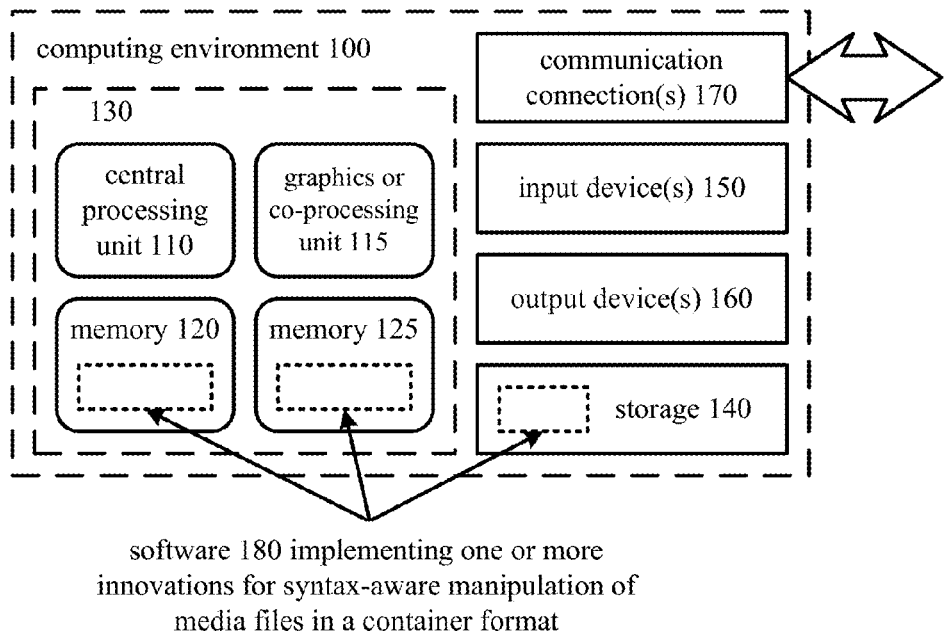
FIG. 1 is a diagram of an example computing system in which some described embodiments can be implemented.

The detailed description presents various innovations for syntax-aware manipulation of media files in a container format. The innovations can include operations for conformance verification for media files, simulation of corruption of media files and other editing of media files.

Verifying that media files produced by different sources are conformant to a given container format helps ensure interoperability with playback equipment. According to one aspect of the innovations described herein, a syntax-aware container format verifier checks the conformance of a media file to a given container format. The media file may include container format syntax elements that indicate timestamps for samples (e.g., frames of video), sizes of chunks of encoded content for samples, offsets or locations of the chunks of encoded content, track information or other information. The container format verifier can verify conformance of such syntax elements to the container format in several ways, including evaluation of individual syntax elements against constraints specified in a container format specification, cross-verification that the value of a syntax element is consistent with values of other, related syntax elements defined according to the container format, and verification that any mandatory syntax elements defined according to the container format are present.

Simulating corruption of media files can help test the capabilities of container format sources. According to another aspect of the innovations described herein, a syntax-aware container format fuzzer simulates any of several types of corruption to syntax elements defined according to a container format in a media file, while keeping intact the file format structure of the media file. A container format source, which parses and consumes media files in a container format, can be vulnerable to errors in media files. Evaluating the performance of a container format source, when it encounters different types of corrupted media files during bottom-level parsing operations, can lead to improvements in detection of errors, protection against errors, concealment of errors and recovery from errors. In this way, a container format source can be made more robust to corruptions from which the container format source can recover (concealing certain kinds of errors and recovering playback rather than simply stopping playback), while more accurately identifying situations in which the container format source should stop playback.

According to another aspect of the innovations described herein, a syntax-aware container format editor edits media files in a container format, which facilitates evaluation and sharing of media files that have desired properties. For example, the container format editor detects and corrects corruptions in a media file. Or, as another example, the container format editor makes a media file by inserting new syntax elements defined according to the container format, so as to model a problem seen in another media file. In this way, for a given media file in a container format, the container format editor can generate a different combination of syntax elements defined according to the container format, in order to demonstrate a problem identified in another media file, without using encoded media content that has access restrictions due to copyright concerns or digital rights management.

Although operations described herein are in places described as being performed by a container format processing tool associated with a container format sink or container format source, in many cases the operations can alternatively be performed by another type of container format processing tool. Some examples described herein involve video content. More generally, the innovations described herein can be applied for image content (e.g., general still image content, medical scan content, multi-spectral imagery content), audio content or another type of media content.

Some of the innovations described herein are illustrated with reference to syntax elements and operations specific to the MP4 or CFF container format. Innovations described herein can also be implemented for other container formats such as ASF, MPEG-2 TS/PS and MKV.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for syntax-aware manipulation of hierarchically organized syntax elements defined according to a container format in media files, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) (also called computer-readable storage) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for syntax-aware manipulation of hierarchically organized syntax elements defined according to a container format in media files.

The input device(s) (150) may be a touch input device such as a keyboard, mouse, pen, or trackball, a voice input device, touchscreen for receiving gesture input, a scanning device, or another device that provides input to the computing system (100). For video, the input device(s) (150) may be a camera, video card, TV tuner card, or similar device that accepts video input in analog or digital form, or a CD-ROM or CD-RW that reads video samples into the computing system (100). For audio, the input device(s) (150) may be a microphone or similar device that accepts audio input in analog or digital form, or a CD-ROM or CD-RW that reads audio samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions (also called machine-readable instructions), such as those included in program modules (also called computer program product), being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit specially designed or configured to implement any of the disclosed methods (e.g., an ASIC such as an ASIC digital signal process unit, a graphics processing unit, or a programmable logic device such as a field programmable gate array).

For the sake of presentation, the detailed description uses terms like "determine," "provide" and "use" to describe computer operations in a computing system. These terms are high-level abstractions for operations performed by a computer, and should not be confused with acts performed by a human being. The actual computer operations corresponding to these terms vary depending on implementation. As used herein, the term "provided by" means any form of delivery, whether directly from an entity or indirectly from an entity through one or more intermediaries.

II. Example Network Environments.

Figure 2A:
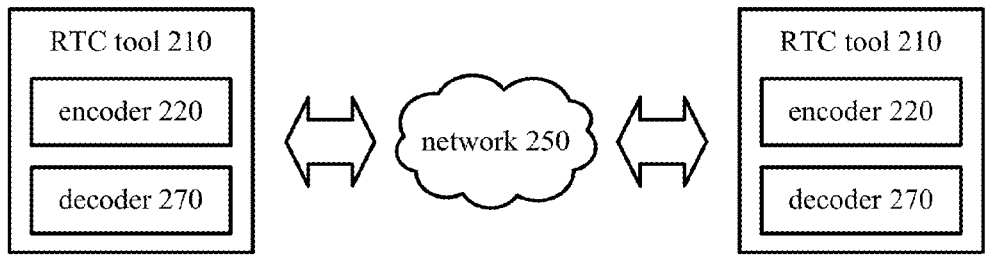
FIGS. 2a and 2b are diagrams of example network environments in which some described embodiments can be implemented.
Figure 2B:
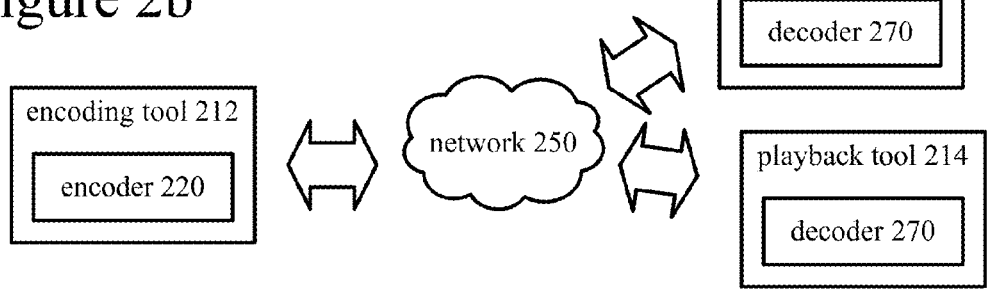

FIGS. 2a and 2b show example network environments (201, 202) that include media encoders (220) and media decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes one or more encoders (220) and one or more decoders (270) for bidirectional communication, as well as container format sink and source tools (not shown). For video, a given encoder (220) can produce output compliant with the SMPTE 421M standard, ISO/IEC 14496-10 standard (also known as H.264 or AVC), HEVC standard, another standard, or a proprietary format, with a corresponding decoder (270) accepting encoded data from the encoder (220). For audio, a given encoder (220) can produce output compliant with the HE AAC standard, AAC standard, a Windows Media Audio ("WMA") format, or another proprietary format, with a corresponding decoder (270) accepting encoded data from the encoder (220). A container format sink processes outgoing media content according to a container format, and a container format source processes incoming media content according to a container format. The bidirectional communication can be part of a video conference, video telephone call, or other two-party communication scenario. Although the network environment (201) in FIG. 2a includes two real-time communication tools (210), the network environment (201) can instead include three or more real-time communication tools (210) that participate in multi-party communication.

Figure 3:
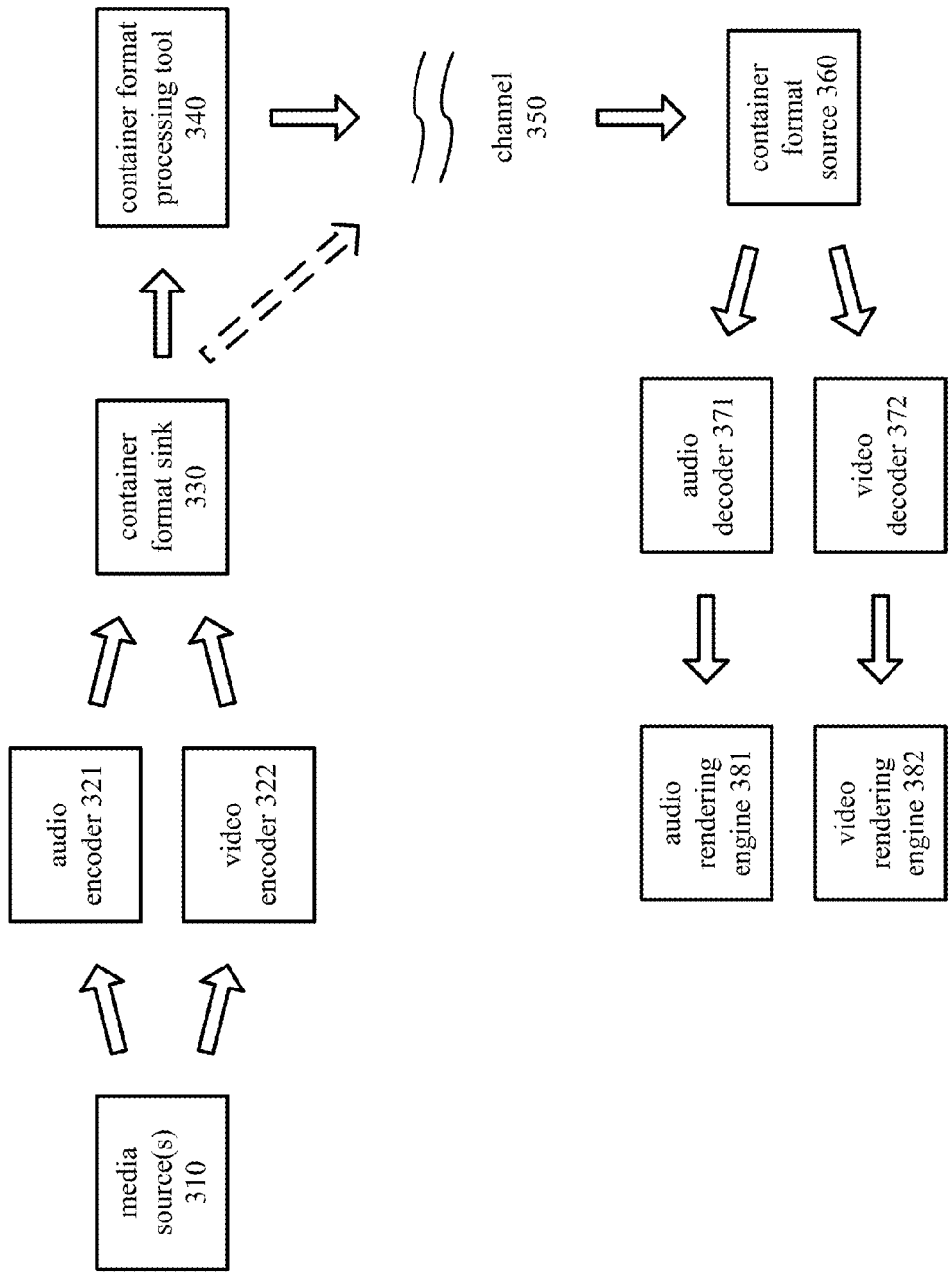
FIG. 3 is a diagram of an example media processing system in which some described embodiments can be implemented.

A real-time communication tool (210) manages encoding by an encoder (220). FIG. 3 shows (in the top half) an example encoder system, including a container format sink, which can be included in the real-time communication tool (210). Alternatively, the real-time communication tool (210) uses another encoder system. A real-time communication tool (210) also manages decoding by a decoder (270). FIG. 3 also shows (in the bottom half) an example decoder system, including a container format source, which can be included in the real-time communication tool (210). Alternatively, the real-time communication tool (210) uses another decoder system.

In the network environment (202) shown in FIG. 2b, an encoding tool (212) includes one or more encoders (220) that encode media for delivery to multiple playback tools (214), which include decoders (270). In the encoding tool (212), a container format sink (not shown) processes outgoing media content according to a container format. In a playback tool (214), a container format source (not shown) processes incoming media content according to the container format. The unidirectional communication can be provided for a video surveillance system, web camera monitoring system, remote desktop conferencing presentation or other scenario in which media is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of media for the playback tool (214) to receive. The playback tool (214) receives the stream, buffers the received encoded data for an appropriate period, and begins decoding and playback.

FIG. 3 shows (in the top half) an example encoder system, including a container format sink, which can be included in the encoding tool (212). Alternatively, the encoding tool (212) uses another encoder system. The encoding tool (212) can also include server-side controller logic for managing connections with one or more playback tools (214). FIG. 3 also shows (in the bottom half) an example decoder system, including a container format source, which can be included in the playback tool (214). Alternatively, the playback tool (214) uses another decoder system. A playback tool (214) can also include client-side controller logic for managing connections with the encoding tool (212).

The network environment (201) shown in FIG. 2a can include multiple RTC tools with multiple encoders. The network environment (202) shown in FIG. 2b can include multiple encoding tools with multiple encoders. Such encoders can produce multiple output bitstreams that are spliced by a splicing tool into a single bitstream. Or, a single encoder can produce multiple bitstreams that are spliced by a splicing tool into a single bitstream.

III. Example Container Format Processing Tools and Container Formats.

FIG. 3 is a block diagram of an example media processing system (300) in conjunction with which some described embodiments may be implemented. At the encoder side, the system (300) includes one or more media sources (310), an audio encoder (321), a video encoder (322) and container format sink (330). At the decoder side, the system (300) includes a container format source (360), audio decoder (371), video decoder (372) and rendering engines (381, 382).

A media source (310) provides media content. For video, the media source (310) can be a camera, tuner card, storage media, screen capture module, animation output or other video source. A video source typically produces a sequence of video frames. For purposes of container format processing, a "sample" of video is typically a video frame associated with a time instance, but can instead be an interlaced video field or video object plane that represents a video object at a given time. For image content, the media source (310) can be a graphics output, scanner, medical imaging tool or other digital image source, and a sample is typically an image. For audio content, the media source (310) can be a microphone, other voice input device, storage media or other audio source. For purposes of container format processing, a "sample" of audio is typically a frame of amplitude values associated with a given time or time span.

Before the encoders (321, 322), the system (300) can include a buffer for storing media content as well as a pre-processor that performs pre-processing (e.g., filtering) of the media content before encoding. For image or video content, for example, the pre-processing can also include color space conversion, color range scaling and/or other processing.

In general, an encoder (whether audio encoder (321), video encoder (322) or other encoder) receives media content provided by a media source (310) and produces encoded media content in an elementary media bitstream as output to the container format sink (330). The encoder (321, 322) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. The encoder (321, 322) can be implemented as an operating system module, as part of an application library, as a part of a standalone application or using special-purpose hardware.

Generally, an encoder (321, 322) includes multiple encoding modules that perform encoding tasks such as prediction, frequency transforms, quantization and entropy coding. The exact operations performed by the encoder (321, 322) can vary depending on codec format. For video, the format of the output encoded video content can be a Windows Media Video format, VC-1 format, MPEG-x format (e.g., MPEG-1, MPEG-2, or MPEG-4), H.26x format (e.g., H.261, H.262, H.263, H.264), HEVC format, VPx format or other format. For images, the format of the output encoded image content can be JPEG format, JPEG-XR format or another format. For audio, the format of the encoded audio content can be an AAC format (e.g., HE AAC), WMA format or other format.

The encoded media content in the elementary media bitstreams is aggregated and buffered in a temporary coded data area. The encoded media content that is aggregated can include, as part of the syntax of the respective elementary media bitstreams, media metadata relating to the encoded media content.

The container format sink (330) receives the encoded media content in the elementary bitstreams. The container format sink (330) organizes the encoded media content in a media file according to a container format such as MP4 (ISO/IEC 14496-12, -14 or -15), CFF, ASF or another container format. In example implementations, the container format sink (330) is an MP4 sink or CFF sink. Depending on implementation, the container format sink (330) can packetize the encoded media content for transmission as a media stream or for storage as a file according to a container format, in which case the container format sink (330) adds elements as part of the syntax of the media file. Or, more generally, the container format sink (330) can implement one or more media system multiplexing protocols or transport protocols for a container format. The container format sink (330) can be implemented as an operating system module, as part of an application library, as part of a standalone application or using special-purpose hardware.

The container format sink (330) can provide the media file in the container format for output to a channel (350). The channel (350) represents storage, a communications connection (e.g., over the Internet) or another channel for the output.

Or, the container format sink (330) can provide the media file in the container format to a container format processing tool (340), which performs syntax-aware manipulation of container format syntax elements. The container format processing tool (340) can be implemented as an operating system module, as part of an application library, as part of a standalone application or using special-purpose hardware. Although FIG. 3 shows the container format processing tool (340) receiving media files from the container format sink (330) and providing output to the channel (350), alternatively the container format processing tool (340) is located elsewhere in the system (300). For example, the container format processing tool (340) can receive media files from the channel (350), and provide adjusted media files back to the channel (350) or to the container format source (360). Or, one or more modules of the container format processing tool (340) can be implemented directly in the container format sink (330), e.g., for conformance verification.

Figure 4:
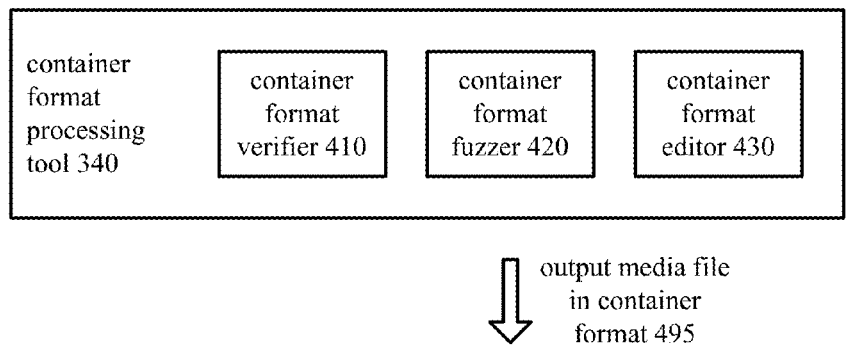
FIG. 4 is a diagram of a container format processing tool in conjunction with which some described embodiments can be implemented.

FIG. 4 shows an example architecture for the container format processing tool (340). The container format processing tool (340) accepts an input media file (405) in a container format and produces an output media file (495) in the container format. The container format processing tool (340) includes a container format verifier (410), a container format fuzzer (420) and a container format editor (430). The container format processing tool (340) also includes a buffer (not shown) for temporarily storing the input media file (405), and a buffer (not shown) for temporarily storing the output media file (495).

The container format verifier (410) is adapted to perform one or more types of operations to verify that a media file conforms to a container format. For example, the container format verifier (410) is adapted to perform single-element verification, cross-verification, synchronization checking and/or verification that any mandatory container format syntax elements are present, as described in section IV. Alternatively, the container format verifier (410) is adapted to perform other and/or additional types of operations to verify conformance to a container format.

The container format fuzzer (420) is adapted to perform one or more types of operations to simulate corruption of a media file in a container format. For example, the container format fuzzer (420) is adapted to replace valid values of container format syntax elements with random values, simulate audio recording failure and/or simulate incorrect termination of recording, as described in section IV. Alternatively, the container format fuzzer (420) is adapted to perform other and/or additional types of operations to simulate corruption of a media file.

The container format editor (430) is adapted to perform one or more types of operations to otherwise edit a media file in a container format. For example, the container format editor (430) is adapted to insert new syntax elements defined according to the container format into the media file, as described in section IV. Alternatively, the container format editor (430) is adapted to perform other and/or additional types of editing operations.

The container format processing tool (340) can omit one or more of the container format verifier (410), fuzzer (420) and editor (430). Alternatively, the container format processing tool (340) can include other and/or additional modules.

Figure 5:
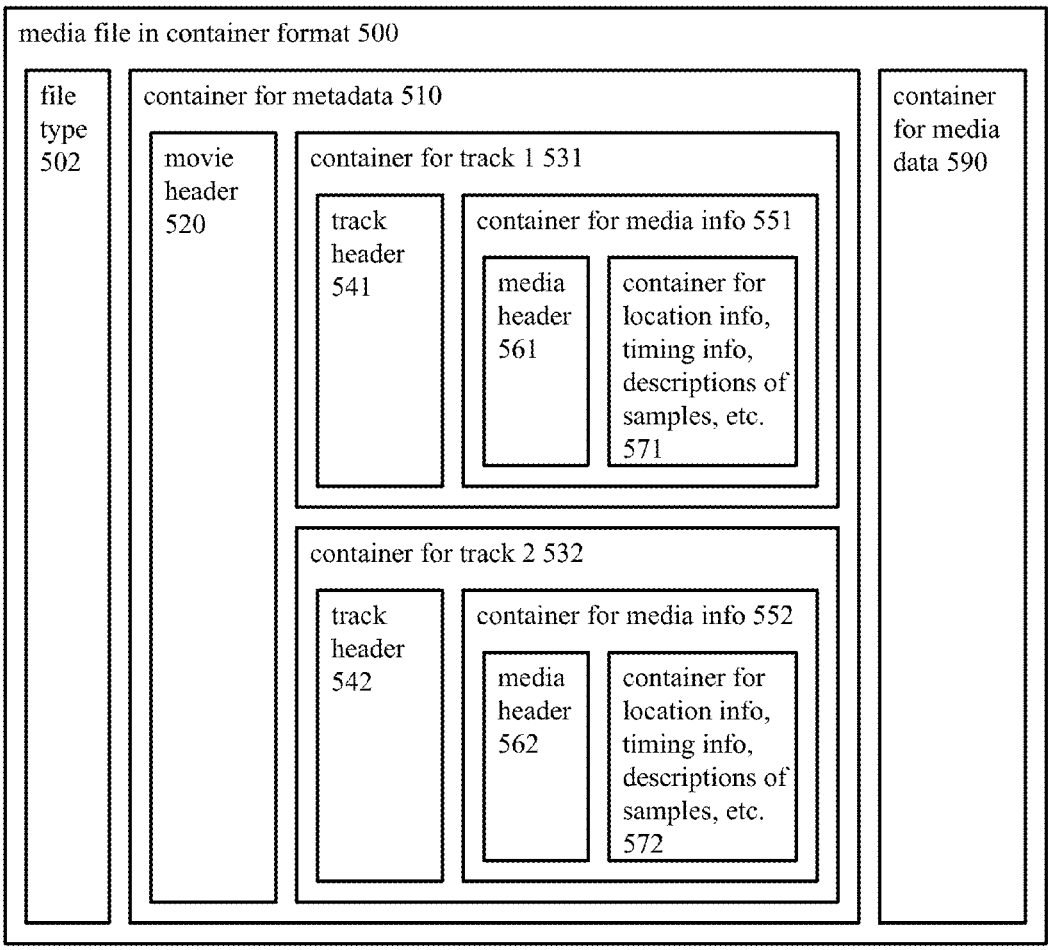
FIG. 5 is a diagram of hierarchically organized syntax elements defined according to a container format in a media file.

FIG. 5 shows an example media file (500) in a container format. The media file (500) is tree-structured, or hierarchically organized, including objects (sometimes called "boxes") that contain other objects and/or container format attributes. An object (box) typically includes a size (i.e., length) value and type value for the box, followed by other attributes and/or contained objects. A "container" is an object that contains and groups a set of other objects, but typically does not itself contain attributes (aside from size and type values). A container format syntax element can be an object (box) or attribute.

The media file (500) includes metadata for a presentation with audio content, video content, image content and/or other content. The presentation is logically divided into tracks such as a video track and audio track. For a track, each timed unit is a sample (e.g., a frame of video, frame of audio). Samples in a track are numbered. A track also has one or more sample descriptions. A sample in a track is tied to a description by reference, and the description for a sample indicates how the sample may be decoded.

For the media file (500), the physical structure of the file (500) is not tied to the physical structure and organization of the media content. That is, header information and other metadata about a sample need not adjoin encoded media content for the sample within the media file (500). Further, neither the physical structure of the media file (500) nor the layout of the encoded media content is tied to time ordering of the media samples. Instead, file structures and other syntax elements defined according to the container format specify the placement and timing of the media samples, e.g., with timestamps. This facilitates seek operations and random access.

In FIG. 5, the media file (500) contains the file type (502), a container for metadata (510) and a container for media data (590). The file type (502) indicates the container format specification(s) to which the media file (500) conforms. The container for metadata (510) contains metadata for the presentation, and the container for media data (590) contains encoded media content for, e.g., samples of video and samples of audio. Alternatively, the encoded media content can be stored apart from the media file (500), with references within the media file (500) indicating locations for the encoded media content.

The container for metadata (510) contains a movie header (520) and two containers for tracks (531, 532). The movie header (520) contains syntax elements relevant to the entire presentation, such as duration, time scale, preferred playback rate and preferred volume. Each track container (531, 532) contains a track header (541, 542) and container for media information (551, 552). The track header (541, 542) contains syntax elements relevant for a track, such as a track identifier, duration and (for video) width, height and layer. The container for media information (551, 552) includes a media header (561, 562) and additional information (571, 572) for timing of samples, sample descriptions, location of chunks of encoded media content for samples, etc. For additional details about syntax elements in example container formats, see, e.g., ISO/IEC 14496-12, -14 and -15 or the CFF specification.

Alternatively, a media file includes other and/or additional container format syntax elements.

Returning to FIG. 3, the container format source (360) receives and processes the media file in the container format. The container format source (360) removes the encoded media content that is organized in the media file according to a container format such as MP4, ASF, WebM or another container format. In example implementations, the container format source (360) is an MP4 source or CFF source. The container format source (360) can detect and correct certain types of problems with container format syntax elements, as explained in section IV.

Depending on implementation, the container format source (360) can de-packetize encoded media content that has been aggregated for transmission as a media stream or for storage as a file according to the container format, in which case the container format source (360) parses syntax elements added as part of the syntax of the media file. Or, more generally, the container format source (360) can implement one or more media system demultiplexing protocols or transport protocols for the container format. The container format source (360) can be implemented as an operating system module, as part of an application library, as part of a standalone application or using special-purpose hardware.

The encoded media content that is output from the container format source (360) (as one or more elementary media bitstreams) is stored in a temporary coded data area until a sufficient quantity of such data has been received. The encoded media content that is buffered can include, as part of the syntax of an elementary media bitstream, media metadata relating to the encoded media content.

In general, a decoder (whether audio decoder (371), video decoder (372) or other decoder) receives encoded media content provided by the container format source (360) in elementary media bitstreams and produces reconstructed media content. The decoder (371, 372) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder (371, 372) can be implemented as an operating system module, as part of an application library, as part of a standalone application, or using special-purpose hardware.

Generally, a decoder (371, 372) includes multiple decoding modules that perform decoding tasks such as entropy decoding, inverse quantization, inverse frequency transforms and prediction. The exact operations performed by the decoder (371, 372) can vary depending on codec format. For video, the format of the encoded video content can be a Windows Media Video format, VC-1 format, MPEG-x format (e.g., MPEG-1, MPEG-2, or MPEG-4), H.26x format (e.g., H.261, H.262, H.263, H.264), HEVC format, VPx format or other format. For images, the format of the encoded image content can be JPEG format, JPEG-XR format or another format. For audio, the format of the encoded audio content can be an AAC format (e.g., HE AAC), WMA format or other format.

A decoded frame temporary memory storage area can include multiple frame buffer storage areas for reconstructed media content. A rendering engine (381, 382) processes the reconstructed media content for output. The audio rendering engine (381) processes reconstructed audio for output, and the video rendering engine (382) processes reconstructed video for output. In example implementations, the video rendering engine (382) includes a color converter and display module.

IV. Syntax-Aware Manipulation of Container Format Syntax Elements

Innovations described herein provide ways to perform syntax-aware manipulation of hierarchically organized syntax elements defined according to a container format in a media file.

FIG. 6 shows a generalized technique (600) for syntax-aware manipulation of hierarchically organized syntax elements defined according to a container format in a media file. A container format processing tool such as described with reference to FIG. 3 performs the technique (600).

The container format processing tool receives (610) a media file in a container format for a presentation. The presentation includes audio content, image content and/or video content. The container format is tree-structured such that the media file includes hierarchically organized syntax elements defined according to the container format. For example, the container format is MP4, CFF or another container format. More generally, the hierarchically organized syntax elements defined according to the container format are objects and attributes of objects that are nested in a hierarchy according to the container format.

The container format processing tool performs (620) syntax-aware manipulation of at least some of the hierarchically organized syntax elements defined according to the container format in the media file. For example, the syntax-aware manipulation can include conformance verification (section IV.A), simulation of corruption of the media file (section IV.B) and/or other editing of the media file (section IV.C).

A. Conformance Verification

For conformance verification, a container format verifier of a container format processing tool checks that container format syntax elements of a media file conform to a container format specification. This can help ensure interoperability for media files produced by diverse sources.

FIG. 7 shows a technique (700) for verifying conformance of a media file in a container format. A container format processing tool such as described with reference to FIG. 3 performs the technique (700).

FIG. 7 shows four major stages of operations for conformance verification. Alternatively, a container format processing tool performs other and/or different operations as part of conformance verification. In particular, the tool need not perform all of the operations shown in FIG. 7.

According to the technique (700) shown in FIG. 7, the tool verifies (710) container format syntax elements, taken individually. For example, as part of such single-element verification for hierarchically organized syntax elements defined according to the container format, for a given syntax element, the tool checks that the value of the syntax element satisfies one or more constraints for the syntax element. Typically, the constraints are defined for the syntax element in the relevant container format specification. The tool can check all syntax elements (boxes, attributes) in the media file or check a subset of the syntax elements. The tool can perform single-element verification during parsing of the syntax elements of the media file according to the container format specification, or at a later stage.

The container format processing tool also cross-verifies (720) values of selected container format syntax elements. For example, as part of such cross-verification for a set of hierarchically organized syntax elements defined according to the container format, for a given syntax element, the tool checks that the value of the syntax element is consistent with values of one or more other syntax elements among the hierarchically organized syntax elements. This verifies that interactions between the given syntax element and other syntax elements within the media file are valid. Table 1 describes instances of cross-verification for some MP4 syntax elements in example implementations.

| Syntax Element(s) or Condition | Evaluation for Cross-Verification |
|---|---|
| duration syntax element in track header (tkhd) box | The duration syntax element in a track header box is an integer that indicates the duration of the track, in the timescale indicated in the movie header box. The value of the duration syntax element in the track header box should be equal to the sum of the durations of all of the track's edits. If there is no edit list, however, then the duration in the track header box should be equal to the sum of the sample durations, converted into the timescale from the movie header box. If the duration of the track cannot be determined, then the duration should be set to all 1s (32-bit maxint). If the above constraints are not satisfied, the media file is not conformant. |
| sample_number syntax element in the sync sample (stss) box | The sample_number syntax element in the sync sample box gives the numbers (identifying numbers) of the samples that are random access points in the stream, where a sample can be a video frame or audio frame, for example. The value of a sample_number element in the sync sample box should not be larger than the value of the sample_count element in the sample size (stsz) box. The sample_count element in the sample size (stsz) box is an integer that gives the number (count) of samples in the track. |
| entry_size syntax element in the sample size (stsz) box | If the value of the sample_size element in the sample size box is 0, then samples can have different sizes, and the sizes of the samples are individually specified. For each of the number of samples in the track (sample_count), a table includes an entry_size syntax element, which is an integer specifying the size of one sample, indexed by its number. The sum of sample sizes (as specified by entry_size elements) should not be larger than the media file size. |
| media file with movie fragments has random access capability | If a media file with movie fragments also has random access capability, the media file shall have a movie fragment random access (mfra) box and track fragment random access (tfra) boxes. |
| chunk_offset syntax element in the chunk offset, partial data-offset information (stco) box | The value of a chunk_offset syntax element indicates the offset of the start of a chunk into the media file containing the chunk. The maximum value indicated by the chunk_offset syntax elements in a table in the stco box should not be larger than the file size. |
| count of entries in the composition time to sample (ctts) box compared to count of samples from decoding time to sample (stts) box | The stts box includes a table that facilitates indexing from decoding time to sample number, where each entry gives a time delta and a count of consecutive samples having that time delta. The ctts box includes a table that provides offsets between decoding time and composition time, where each entry gives a composition time offset (relative to decoding time) and count of consecutive samples having that composition time offset. The number of entries in the ctts box shall be less than or equal to the count of samples from the stts box. |
| movie fragment random access offset (mfro) box and movie fragment random access (mfra) box | The mfra box provides a table that may facilitate finding random access points in a file with movie fragments. Typically, the mfra box is at the end of the media file. The last box in the mfra box is the mfro box, which includes a size attribute that repeats size of the mfra box. The size attribute of the mfro box should match the size value given for the mfra box itself, such that an offset computed from the end of the file (using the size attribute of the mfro box) points to the mfra box, adjusting for box size. |
| syntax elements of track fragment random access (tfra) box of movie fragment random access (mfra) box | The mfra box contains a tfra box for each track for which random access information is provided. A tfra box contains entries for random access samples, where each entry gives the location and presentation time for a random access sample using syntax elements moof_offset, traf_number, trun_number and sample_number. For an entry in the tfra box, the moof_offset syntax element should provide a valid offset from the beginning of the file to a movie fragment (moof) box for the sample, and the traf_number, trun_number and sample_number syntax elements should exist and be valid to identify the sample within a track fragment run of a movie fragment in the moof box. |
| sequence_number syntax element in movie fragment header (mfhd) box of movie fragment (moof) box | A moof box contains a mfhd box and one or more tfra boxes for a movie fragment that extends a presentation in time. In the mfhd box, the sequence_number syntax element provides an ordinal number for the fragment. The sequence_number for a fragment should be in increasing order compared to sequence_number for earlier fragments. |
| parent and child boxes | The size of a parent box shall be enough to include syntax elements of the parent box itself and all its child boxes. |
| sample_size syntax elements of track fragment run (trun) box and size of media data (mdat) box | A track run documents a contiguous set of samples for a track fragment for a track. The samples in the track run can have a default size or explicitly signaled sizes. The sum of sample sizes for the samples in the track run should be less than or equal to the size of the mdat box. |

Alternatively, a container format processing tool checks other and/or additional instances of cross-verification.

Figure 8:
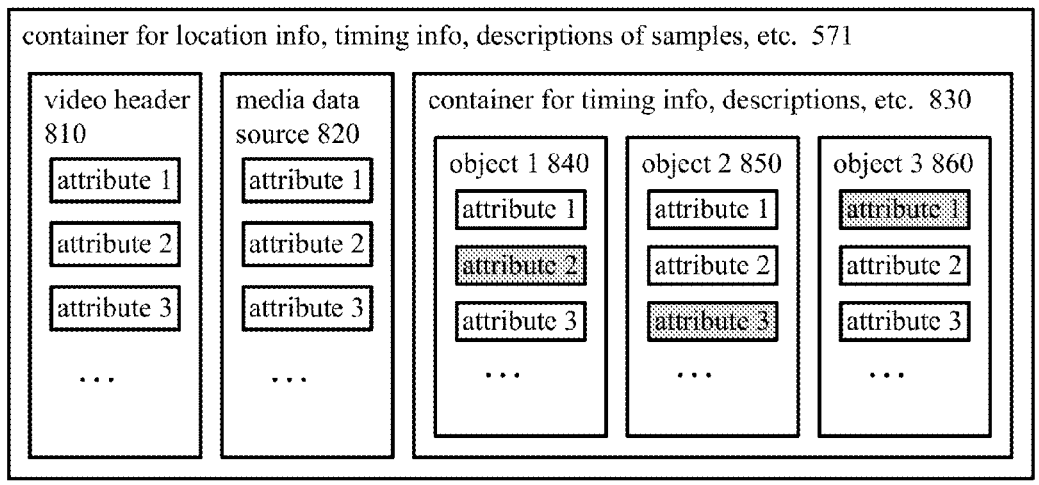
FIG. 8 is a diagram illustrating cross-verification of syntax elements defined according to a container format in a media file.

FIG. 8 shows a generalized example of cross-verification. In FIG. 8, a container (571) has information about timing of samples, sample descriptions and location of chunks of encoded media content for samples. The container (571) includes a video header (810) with attributes about use of the video, a media data source (820) object with attributes about locations of chunks of samples, and a container (830) including objects (840, 850, 860) with information about timing of samples, sample descriptions, etc. For cross-verification, the tool verifies that the value of attribute 2 of object 1 (840) is consistent with the values of attribute 3 of object 2 (850) and attribute 1 of object 3 (860).

Returning to FIG. 7, the container format processing tool also verifies (730) the presence of any mandatory syntax elements among the hierarchically organized syntax elements defined according to the container format. For example, the tool checks that any container format syntax elements that are required for any media file are present. Also, considering the features that are used for a given media file (e.g., random access for movie fragments), the tool can check for presence of container format syntax elements that support the feature. (This can be viewed as a case of cross-verification.)

Finally, the container format processing tool verifies (740) synchronization. For example, to check synchronization between audio samples and video samples in the presentation, the tool checks that a timestamp for one of the audio samples is sufficiently close (e.g., according to a pre-defined threshold) to a timestamp for a corresponding one of the video samples. In this way, the tool verifies that timestamps are not too far apart. If timestamps are too far apart, the tool can adjust timestamps, drop frames (e.g., video frames) to improve synchronization, or cause playback to fail.

B. Simulating Corruption

The container format processing tool can also simulate corruption of a media file in a container format. A corrupt media file can cause a container format source to crash during parsing, or otherwise cause a denial of service. By simulating corruption of media files, the tool facilitates testing of the capabilities of a container format source.

The container format processing tool can alter a media file in different ways to simulate different kinds of corruption to the media file. In some cases, a media file in a container format is corrupted due to random bit flips during streaming or conferencing. The container format tool can simulate such corruption using the technique (900) shown in FIG. 9. A container format processing tool such as described with reference to FIG. 3 performs the technique (900).

The container format processing tool gets (910) the next container format syntax element to alter in a media file. For example, the tool skips ahead within the media file, or within an object in the media file, to identify the next container format syntax element to alter. Or, the tool identifies a next container format syntax element of a type selected by a user for alteration.

The tool replaces (920) the value of the container format syntax element with another value. For example, the tool simulates one or more random bit flips when it replaces the value of the syntax element. Alternatively, the tool replaces the value in some other way.

The tool checks (930) whether to alter any more container format syntax elements and, if so, gets (910) the next container format syntax element to alter. In this way, the tool can alter one or more container format syntax elements in the media file.

Figure 9:
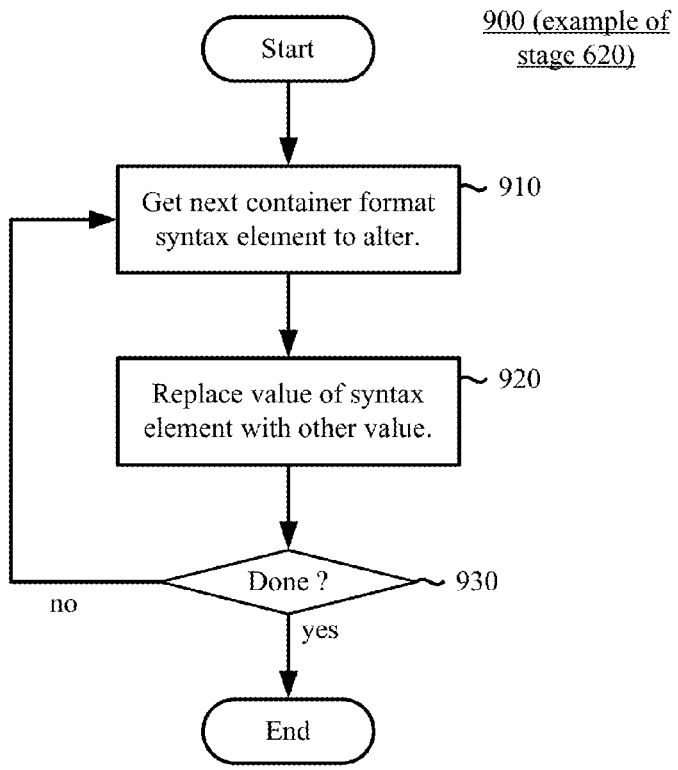
FIG. 9 is a flowchart illustrating a technique for simulating corruption of a media file in a container format.

Thus, according to the technique (900) shown in FIG. 9, the container format processing tool replaces valid values with other values (e.g., random values) for at least some of the hierarchically organized syntax elements defined according to the container format. At the same time, however, the tool preserves the file format structure for the media file in the container format. Evaluating the performance of a container format source, as it encounters different types of errors during bottom-level parsing operations, can lead to improvements in detection of errors, protection against errors, concealment of errors and recovery from errors.

Figure 10:
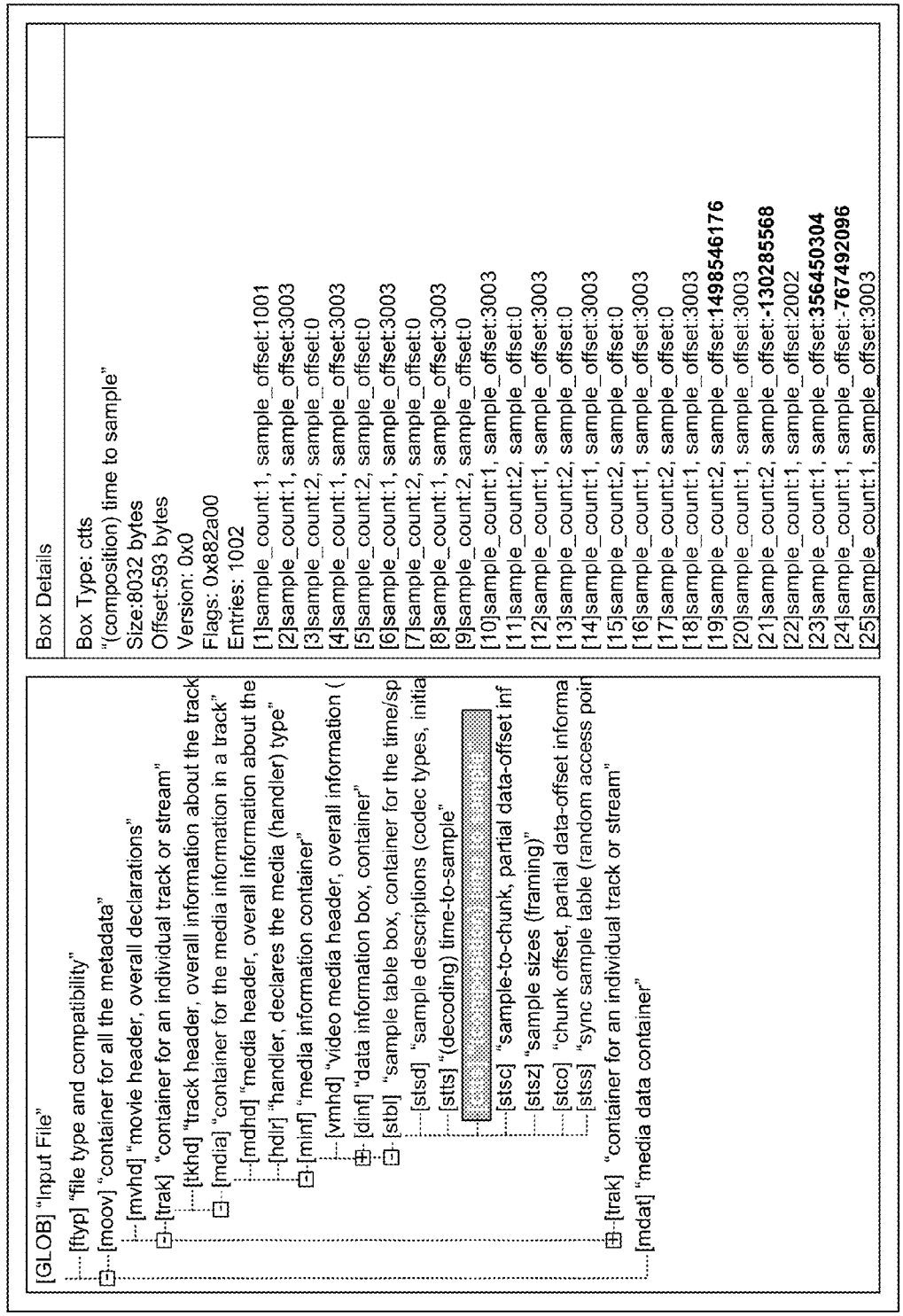
FIG. 10 is a chart illustrating a screen of a property explorer, showing values of selected syntax elements defined according to a container format in a media file that have been replaced with random values to simulate corruption of the media file.

FIG. 10 shows a screen (1000) of a property explorer, showing values of selected MP4 syntax elements in a media file that have been replaced with random values to simulate corruption of the media file. The file format structure of the media file is kept intact, but values of several sample_offset syntax elements in the "(composition) time to sample" box have been altered.

A media file can be corrupted in other ways. In some cases, a media file in a container format is corrupted due to an audio recording failure. For example, a recording system in a smartphone or elsewhere may be initialized to record both audio and video, but no audio data is received for some reason. The resulting media file has an audio track that is empty, without meaningful structure. The container format processing tool can simulate such an audio recording failure by removing audio data from an audio track of a media file in a container format. In still other cases, a media file in a container format is corrupted due to incorrect termination of recording. For example, a recording system in a smartphone or elsewhere may propagate invalid data at the end of recording to a box of the media file. The container format processing tool can simulate such incorrect termination of recording by adding extraneous syntax elements defined according to the container format to an object of the media file in the container format.

When it parses and consumes a media file, a container format source can react to errors in the media file in different ways. For some types of errors, the container format source terminates playback, e.g., when parsing fails. For other types of errors, the container format source may be able to continue, ignoring the error or attempting to correct or conceal the error.

In general, the container format source detects errors in media files and has the capability to conceal or recover from at least some types of errors, so as to provide a better user experience when it encounters a corrupted media file. For example, the container format processing tool may detect certain types of errors in container format syntax elements and correct the errors based on inferences from other values. Below are some specific examples.

A duration value can be corrected to be internally consistent with other duration values.

Playback for a sample can be skipped if its sample size exceeds a size threshold (set based on values of sample size for other samples, or set to a pre-defined threshold).

If the size field in the movie fragment random access offset (mfro) box is incorrect (e.g., because it does not match the size value specified for the parent movie fragment random access (mfra) box), random access capability of the media file can be disabled, such that only sequential playback is enabled.

If the sum of sample sizes for the samples in a track run (as indicated in a track fragment run (trun) box) is larger than the size of the media data (mdat) box, the samples for which offsets point outside of the mdat box can be skipped.

Similarly, a chunk with an offset larger than the file size can be skipped.

Alternatively, a container format processing tool detects and corrects other and/or additional types of errors in container format syntax elements.

C. Other Editing

The container format processing tool can otherwise edit a media file in a container format. Such editing can be useful in several scenarios.

Some video files have restrictions on access and distribution, e.g., due to copyright concerns. If certain container format syntax elements, or interesting combinations of container format syntax elements, are only present in a media file with copyright-protected content, dissemination of the media file may be limited, potentially hindering improvements that might be achieved by testing of container format sources. To address this situation, the container format processing tool can insert new container format syntax elements when making another media file that contains different encoded media content. That is, for a given media file having freely distributable media content, the container format processing tool can generate different combinations of container format syntax elements for the media file, without the need of specific video files that may have potential access restrictions due to copyright concerns. The generated combinations of container format syntax elements can model a problem with another media file in the container format (e.g., a problem with a media file that cannot be freely distributed) or model a scenario for testing purposes.

Or, as another example, a container format processing tool can detect and correct errors in a media file, so as to fix problems before further distribution of the media file to container format sources. For example, during parsing of the media file in the container format, the container format processing tool detects one or more corrupted values among the hierarchically organized syntax elements defined according to the container format. The container format processing tool then corrects the one or more corrupted values, for example, as described above with reference to example container format sources.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media storing computer-executable instructions for causing a computing system programmed thereby to perform operations comprising:
    receiving a media file in a container format for a presentation that includes one or more of audio content, image content and video content, wherein the container format is tree-structured such that the media file includes hierarchically organized syntax elements defined according to the container format; and
    performing syntax-aware manipulation of at least some of the hierarchically organized syntax elements defined according to the container format in the media file, including verifying conformance of the media file to the container format, wherein the verifying includes cross-verification for the at least some of the hierarchically organized syntax elements defined according to the container format, the cross-verification including, for a given syntax element of the hierarchically organized syntax elements defined according to the container format, checking that a given one of duration, count of frames, sample size, file size, box size, or chunk offset is consistent between a value of the given syntax element and a value of each of one or more other syntax elements, respectively, of the hierarchically organized syntax elements defined according to the container format.

2. The one or more computer-readable media of claim 1 wherein the verifying further includes single-element verification for the at least some of the hierarchically organized syntax elements defined according to the container format, including, for the given syntax element of the hierarchically organized syntax elements defined according to the container format, checking that the value of the given syntax element satisfies one or more constraints for the given syntax element.

3. The one or more computer-readable media of claim 1 wherein the verifying further includes checking synchronization between audio samples and video samples in the presentation, including checking that a timestamp for one of the audio samples is sufficiently close to a timestamp for a corresponding one of the video samples.

4. The one or more computer-readable media of claim 1 wherein the verifying further includes checking for presence of any mandatory syntax elements among the hierarchically organized syntax elements defined according to the container format.

5. The one or more computer-readable media of claim 1 wherein the performing syntax-aware manipulation further includes simulating corruption of the media file in the container format.

6. The one or more computer-readable media of claim 5 wherein the simulating corruption includes replacing valid values with other values for one or more of the at least some of the hierarchically organized syntax elements defined according to the container format, while preserving file format structure for the media file in the container format.

7. The one or more computer-readable media of claim 5 wherein the simulating corruption includes, for the given syntax element of the hierarchically organized syntax elements defined according to the container format, simulating a random bit flip by altering the value of the given syntax element.

8. The one or more computer-readable media of claim 5 wherein the simulating corruption includes simulating an audio recording failure by removing audio data from an audio track of the media file in the container format.

9. The one or more computer-readable media of claim 5 wherein the simulating corruption includes simulating incorrect termination of recording by adding extraneous syntax elements defined according to the container format to an object of the media file in the container format.

10. The one or more computer-readable media of claim 1 wherein the performing syntax-aware manipulation further includes:
    detecting one or more corrupted values among the hierarchically organized syntax elements defined according to the container format; and
    correcting the one or more corrupted values.

11. The one or more computer-readable media of claim 1 wherein the performing syntax-aware manipulation further includes inserting new hierarchically organized syntax elements defined according to the container format into the media file in the container format to model a problem with another media file in the container format.

12. The one or more computer-readable media of claim 1 wherein the hierarchically organized syntax elements defined according to the container format are objects and attributes of objects that are nested in a hierarchy according to the container format.

13. In a computing system, a method comprising:
receiving a media file in a container format for a presentation that includes one or more of audio content, image content and video content, wherein the container format is tree-structured such that the media file includes hierarchically organized syntax elements defined according to the container format; and
performing syntax-aware manipulation of at least some of the hierarchically organized syntax elements defined according to the container format in the media file, wherein the syntax-aware manipulation includes verifying conformance of the media file to the container format by:
checking for presence of any mandatory syntax elements among the hierarchically organized syntax elements defined according to the container format;
performing single-element verification for each of the at least some of the hierarchically organized syntax elements defined according to the container format; and
performing cross-verification for some of the at least some of the hierarchically organized syntax elements defined according to the container format, the cross-verification including, for a given syntax element of the hierarchically organized syntax elements defined according to the container format, checking that a given one of duration, count of frames, sample size, file size, box size, or chunk offset is consistent between a value of the given syntax element and a value of each of one or more other syntax elements of the hierarchically organized syntax elements, respectively, defined according to the container format.

14. In a computing system, a method comprising:
receiving a media file in a container format for a presentation that includes one or more of audio content, image content and video content, wherein the container format is tree-structured such that the media file includes hierarchically organized syntax elements defined according to the container format; and
performing syntax-aware manipulation of at least some of the hierarchically organized syntax elements defined according to the container format in the media file, including verifying conformance of the media file to the container format, wherein the verifying includes cross-verification for the at least some of the hierarchically organized syntax elements defined according to the container format, the cross-verification including, for a given syntax element of the hierarchically organized syntax elements defined according to the container format, checking that a given one of duration, count of frames, sample size, file size, box size, or chunk offset is consistent between a value of the given syntax element and a value of each of one or more other syntax elements, respectively, of the hierarchically organized syntax elements defined according to the container format.

15. The method of claim 14 wherein the verifying further includes single-element verification for the at least some of the hierarchically organized syntax elements defined according to the container format, including, for the given syntax element of the hierarchically organized syntax elements defined according to the container format, checking that the value of the given syntax element satisfies one or more constraints for the given syntax element.

16. The method of claim 14 wherein the verifying further includes checking synchronization between audio samples and video samples in the presentation, including checking that a timestamp for one of the audio samples is sufficiently close to a timestamp for a corresponding one of the video samples.

17. The method of claim 14 wherein the performing syntax-aware manipulation further includes simulating corruption of the media file in the container format.

18. A computing system comprising:
a buffer for storing a media file in a container format for a presentation that includes one or more of audio content, image content and video content, wherein the container format is tree-structured such that the media file includes hierarchically organized syntax elements defined according to the container format; and
a syntax manipulation tool configured to perform syntax-aware manipulation of at least some of the hierarchically organized syntax elements defined according to the container format in the media file, wherein the syntax manipulation tool is configured to perform conformance verification of the media file to the container format, wherein the conformance verification includes cross-verification for the at least some of the hierarchically organized syntax elements defined according to the container format, the cross-verification including, for a given syntax element of the hierarchically organized syntax elements defined according to the container format, checking that a given one of duration, count of frames, sample size, file size, box size, or chunk offset is consistent between a value of the given syntax element and a value of each of one or more other syntax elements, respectively, of the hierarchically organized syntax elements defined according to the container format.

19. The computing system of claim 18 wherein the conformance verification further includes single-element verification for the at least some of the hierarchically organized syntax elements defined according to the container format, including, for the given syntax element of the hierarchically organized syntax elements defined according to the container format, checking that the value of the given syntax element satisfies one or more constraints for the given syntax element.

20. The computing system of claim 18 wherein the conformance verification further includes checking synchronization between audio samples and video samples in the presentation, including checking that a timestamp for one of the audio samples is sufficiently close to a timestamp for a corresponding one of the video samples.

21. The computing system of claim 18 wherein the syntax-aware manipulation further includes simulating corruption of the media file in the container format.

22. The computing system of claim 18 wherein the hierarchically organized syntax elements defined according to the container format are objects and attributes of objects that are nested in a hierarchy according to the container format.

* * * * *